United States Patent [19]
Suzuki et al.

[11] Patent Number: 6,031,304
[45] Date of Patent: Feb. 29, 2000

[54] MOTOR STRUCTURE

[75] Inventors: Yuzuru Suzuki; Sakae Fujitani; Haruyoshi Hino; Hideki Sakiyama, all of Shizuoka-ken, Japan

[73] Assignee: Minebea Co. Ltd, Nagano, Japan

[21] Appl. No.: 09/008,352

[22] Filed: Jan. 16, 1998

[30] Foreign Application Priority Data

Feb. 3, 1997 [JP] Japan .................................. 9-020542

[51] Int. Cl.$^7$ .................................................. H02K 37/00
[52] U.S. Cl. ........................ 310/49 R; 310/157; 310/257
[58] Field of Search ................................... 310/16, 49 R, 310/156, 157, 164, 193, 257

[56] References Cited

U.S. PATENT DOCUMENTS

| | | | |
|---|---|---|---|
| 4,059,780 | 11/1977 | Mazuir ..................... | 310/164 |
| 4,131,828 | 12/1978 | Houshi ..................... | 318/148 |
| 4,414,942 | 11/1983 | Itoh et al. ................ | 310/49 R |
| 4,642,494 | 2/1987 | Lundin et al. ............ | 310/49 R |
| 4,656,381 | 4/1987 | Komatsu .................. | 310/257 |
| 5,177,384 | 1/1993 | Furuki ...................... | 310/49 R |
| 5,291,084 | 3/1994 | Shiotsuki et al. ........ | 310/49 R |
| 5,410,200 | 4/1995 | Sakamoto et al. ........ | 310/49 R |
| 5,679,997 | 10/1997 | Matsuzawa et al. ..... | 310/254 |
| 5,691,583 | 11/1997 | Suzuki et al. ............. | 310/49 R |
| 5,770,900 | 6/1998 | Sato et al. ................ | 310/49 R |

FOREIGN PATENT DOCUMENTS 1197112  1/1958  France .
 521043  11/1969  Switzerland .

Primary Examiner—Thomas M. Dougherty
Assistant Examiner—Joseph Waks
Attorney, Agent, or Firm—Staas & Halsey, LLP

[57] ABSTRACT

A motor structure including a rotor 1 having a permanent magnet 10 where north poles and south poles are alternately disposed in a moving direction of the rotor, a stator 5a including at least two stator yokes having stator pole teeth 3a, 4a respectively which face to the permanent magnet at a distance and are respectively positioned side by side in the moving direction to bear north poles or south poles respectively due to an electric current flowing through a coil 2a to thereby form at least one phase, wherein the stator pole teeth 3a, 4a are different from each other with respect to an effective area through which magnetic flux passes, whereby high harmonic wave phases generated from the pole teeth 3a, 4a are different from each other by 180 degrees in electric angle to thereby be canceled mutually, therefore an induced electromotive force wave containing hardly high harmonic wave is obtained to thereby reduce a motor vibration.

6 Claims, 8 Drawing Sheets

MOTOR STRUCTURE

BACKGROUND OF THE INVENTION

1. Technical Field of the Invention

This invention is related to an improved motor structure, in particular, a stepping motor structure having an improved magnetic circuit.

2. Description of the Prior Art

Stepping motors are widely used in equipment for office automation, computer peripheral devices, industrial apparatus, etc. The stepping motor is an electric motor to be rotated by input pulse, and its rotation angle is proportional to input pulse number and its rotational speed is proportional to the frequency thereof. Accordingly, it is unnecessary to detect the rotor position in the stepping motor. That is, since the stepping motor is driven while forming open loop, the rotor is rotated while minimizing the magnetic resistance. Accordingly, the rotational state of the rotor of the stepping motor depends on the magnetic flux generated from the rotor, the armature magnetic flux generated from the stator of the motor, and the rotor inertia.

Next, since the stator pole teeth of the stepping motor, especially the stator pole teeth of the claw pole type stepping motor, is formed by punching and folding a plate of soft magnetic material it is impossible in respect of manufacturing technology to prepare very long stator pole teeth. Nevertheless, when it is still desired to prepare long stator pole teeth, generally, the dedenda of the pole teeth are widened to be in the form of trapezoid so as not to produce magnetic saturation of the pole teeth, and the axial lengths of the rotor magnets facing the pole teeth are made to be equal to or longer than the axial lengths of the pole teeth such that the magnets are superimposed on the pole teeth when it is projected thereon.

Furthermore, two kinds of the stator pole teeth constituting one phase are generally formed into the same shape. Accordingly, when driving the stepping motor, changes of the rotational state are caused in conformity with the frequency variation of the input pulse, and the stepping motor is subjected to vibration, thereby bringing about such problems as the exertion of an undesirable influence on the other components of the recent high performance equipment and the high possibility of causing troubles with the equipment. A means for suppressing the vibration of the stepping motor is presented in Japanese Patent Application No. H8-276487, or the like. However, such a method is to reduce the vibration by changing the area where the rotor magnet and the side edge of the pole teeth face each other, and thereby the rotor magnet has its length sufficient to cover the whole lengths of the pole teeth constituting one phase. Accordingly, it is difficult to minimize the magnet length for resource saving, and further downing, lightening and cost reduction of the motor cannot be achieved.

The invention has been made in the light of the above. One object of the invention is to provide a new motor structure where there is removed an immediate cause for generating the vibration disadvantageous to a motor such as a stepping motor to thereby restrain the vibration effectively. Another object of the invention is to provide a low manufacturing cost motor with little vibration.

An effective approach to lowering vibration of the stepping motor is to decrease the detent torque. Then, the presently available method therefor is to wide the clearance between the rotor and the pole teeth, which can surely lower the detent torque. However, it leads to decrease the dynamic torque and thereby deteriorate performance of the motor.

SUMMARY OF THE INVENTION

Under such circumstances, an analysis of the detent torque was advanced by the inventors, and as a result it was clarified that the quantity of the higher harmonic wave component contained in induced electromotive force waves, especially the quantity of the tertiary high harmonic wave component therein, dominates magnitude of the vibration, and further that a quantity (which is hereafter referred to as the skew quantity SK) related to the area where the rotor magnet and the side edge of the stator yoke face each other is one of the elements which have influence on the tertiary high harmonic wave and it does not change the content of the high harmonic wave component (especially the amplitude of the tertiary high harmonic wave) but changes only the difference between the phase of the high harmonic wave component and that of the fundamental wave. Furthermore, it was made clear that there is a certain constant relationship (in quadratic function) between the phase difference and the skew quantity SK and there is no correlation between the skew quantity SK and the amplitude of the high harmonic wave component within a changeable range of the skew quantity, but the correlation depends on the clearance between the pole teeth.

An inter-pole-teeth clearance between the pole teeth of two stator yokes constituting one phase is set to an appropriate width, and the magnetized area of the rotor magnet facing the pole teeth is controlled by regulating the magnetized axial length or the magnetization pattern so that the skew quantity of the pole teeth of each stator yoke is determined to make the phase of the tertiary high harmonic wave induced in the pole teeth of one stator yoke and that of the other stator yoke deviate from each other by 180 degrees in electrical angle. As a result, the two kinds of tertiary high harmonic waves are canceled mutually, and an induced electromotive force waveform containing hardly the high harmonic wave component can be obtained. Therefor the motor with little vibration can be achieved. Even when the present invention is applied to a linear motor formed by linearly developing the stator of the claw pole type stepping motor, the same result can, of course, be obtained. As described so far according to the present invention, only by appropriately setting the length or position of the rotor magnet, or only by adjusting the polarized area of the rotor magnet the phase of the high harmonic wave can be controlled, thereby being able to obtain the motor with little vibration without increasing the number of motor parts, changing the production process or raising manufacturing cost, and besides without degrading the motor performance.

BRIEF DESCRIPTION OF THE DRAWINGS

FIG. 12 is a schematic plan view of the rotor magnet of the invention where the shape or polarized area thereof is made into comb teeth like.

DESCRIPTION OF THE PREFERRED EMBODIMENTS

Next, embodiments of the present invention are described in detail in conjunction with the drawings.

Figure 1:
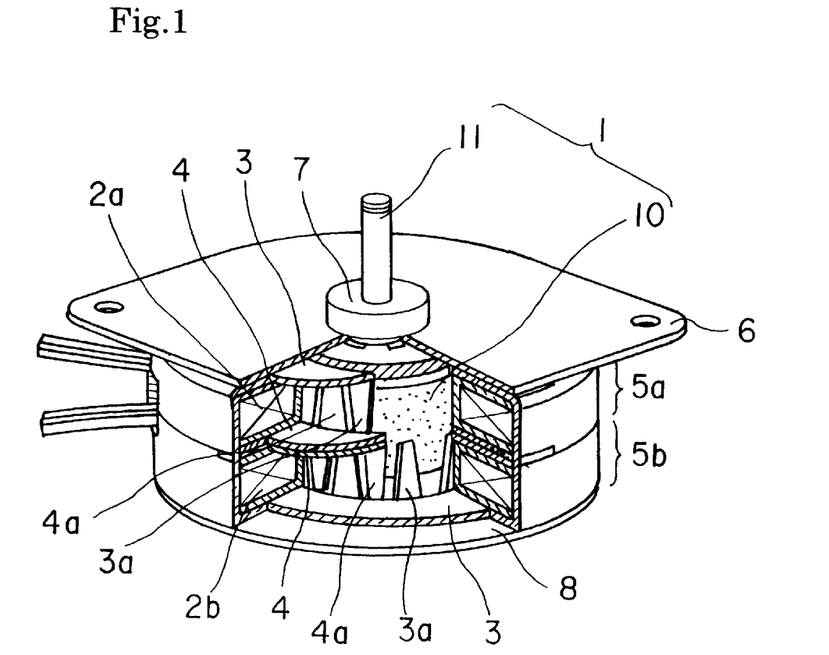
FIG. 1 is a partial cross section in perspective of a preferred embodiment of the invention.
Figure 2:
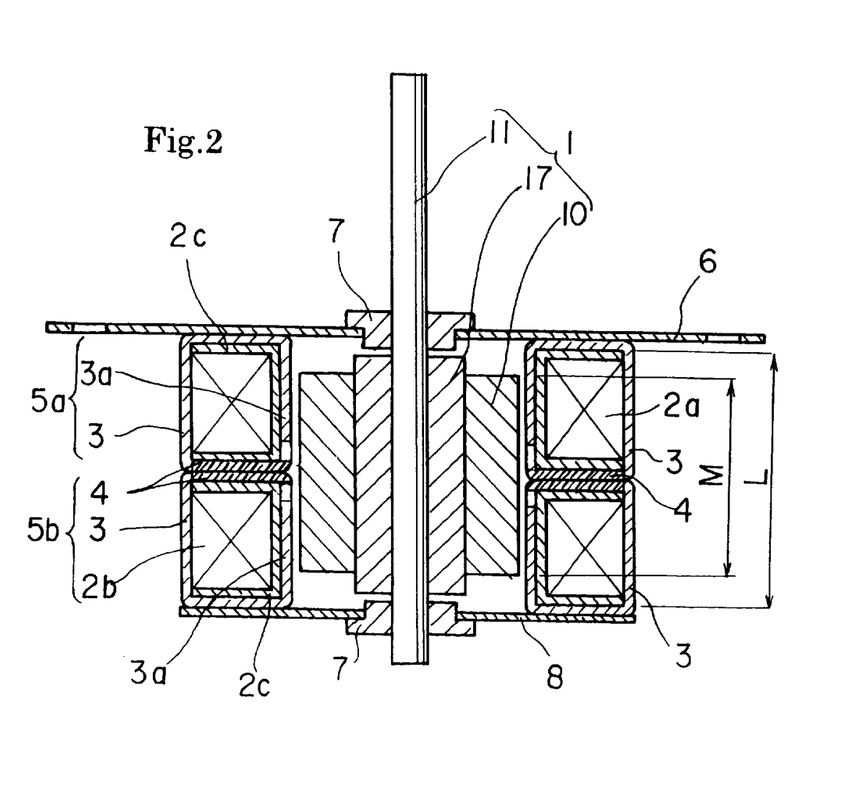
FIG. 2 is a vertical section of a preferred embodiment of the invention.
Figure 3:
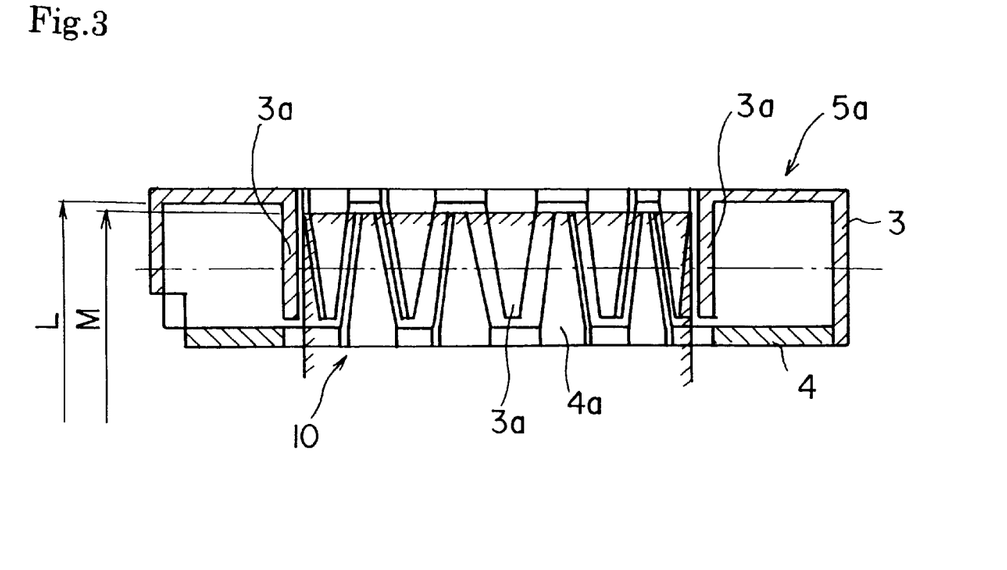
FIG. 3 is a view showing a positional relationship between the pole teeth of each stator pole and the permanent magnets of the rotor in a preferred embodiment of the invention.
Figure 4:
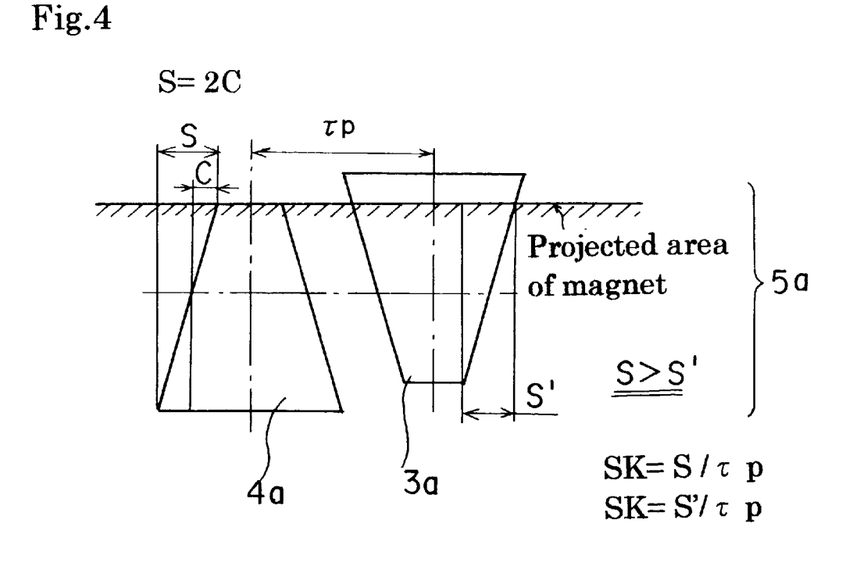
FIG. 4 is a view for explaining a quantity of skew.
Figure 5:
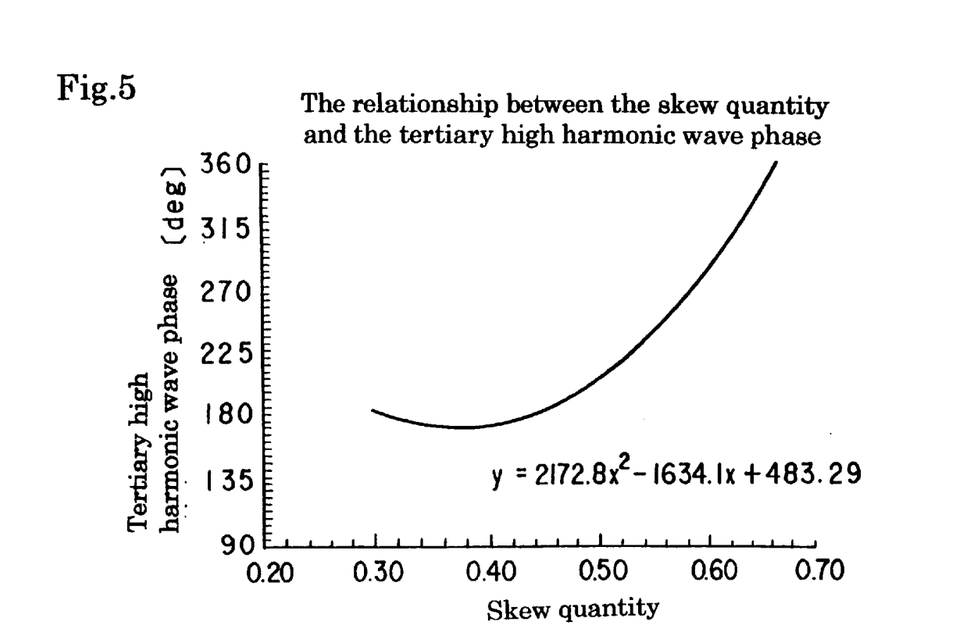
FIG. 5 is a view showing a relationship between a quantity of skew and the tertiary high harmonic wave.

FIG. 1 is a partially cutaway perspective view of a claw pole type stepping motor according to the present invention, FIG. 2 is a vertical section of the stepping motor shown in FIG. 1, and FIG. 3 shows a development elevation where stator pole teeth and a rotor magnet face each other, FIG. 5 is a view showing the relationship (from an experimental result) between the skew quantity of the pole teeth of a 48 step motor and the phase of the tertiary high harmonic wave in an induced electromotive force wave in reference to the fundamental wave induced in the armature coil by rotating the rotor. FIG. 4 is a view showing a definition of the skew quantity. That is, the skew quantity SK is defined as SK=S/τp by the ratio of the slanting section S on the side edge of the pole teeth to the polar pitch τp. If the section S is not covered by a projection area of the rotor magnet as shown in the stator tooth 3a, the superimposed section S' is used (SK=S'/τp).

As clear from FIG. 1, especially from FIG. 2, a rotor 1 consists of a cylindrical permanent magnet 10, a rotation axis 11, and a sleeve 17. The rotor 1 is prepared by integrating the rotation axis 11 with the cylindrical permanent magnet 10 by means of insert molding, and the sleeve 17 is then inserted therebetween to integrate the rotation axis 11 and the cylindrical permanent magnet 10. The peripheral surface of the permanent magnet 10 is magnetized to form 24 poles. The rotation axis 11 of the rotor 1 is rotatably pivoted on bearings 7, 7 fixed to flanges 6, 8 being disposed at the upper and lower ends of the motor in parallel to each other.

An A-phase stator 5a and a B-phase stator 5b are put one on another and disposed outside the periphery of the permanent magnet 10 of the rotor 1 and between the flanges 6 and 8. The A-phase stator 5a is formed into a donut-like hollow cylindrical shape, and is provided with an outer yoke 3 having a right angle portion in cross section consisting of the outer peripheral wall and the upper wall surfaces. The stator pole teeth 3a numbering 12 are shaped into comb-like teeth along the inner peripheral wall of the A-phase stator 5a at an interval from the outer yoke 3. A flat ring-shaped inner yoke 4 is fitted to the lower end of the outer yoke 3. Further, from the inner periphery of the inner yoke 4, stator pole teeth 4a numbering 12 are protruded upward at an interval and so this stator pole tooth 4a and the stator pole tooth 3a are disposed alternately with each other. Inside the space formed of the outer yoke 3 and the inner yoke 4, an A-phase coil 2a prepared by winding a bobbin 2c with magnet wire is accommodated.

The B-phase stator 5b is formed into a donut-like hollow cylindrical shape, and is provided with an outer yoke 3a having a right angle portion in cross section consisting of the outer peripheral wall and the lower wall surface. The stator pole teeth 3a numbering 12 are shaped into comb-like teeth along the inner peripheral wall of the B-phase stator 5a at an interval from the outer yoke 3. A flat ring-shaped inner yoke 4 is fitted to the upper end of the outer yoke 3. Further, from the inner periphery of the inner yoke 4, the stator pole teeth 4a numbering 12 are protruded downward at an interval, and so this stator pole tooth 4a and the stator pole tooth 3a are disposed alternately with each other. Inside the space formed of the outer yoke 3 and the inner yoke 4, a B-phase coil 2b prepared by winding a bobbin 2c with magnet wire is accommodated. The B-phase coil 2b has the same structure as the A-phase coil 2a, the B-phase coil 2b is disposed like turning the coil 2a upside down, the A-phase stator 5a and the B-phase stator 5b make a phase difference of 90 degrees in electrical angle, and a couple of inner yokes 4,4 are fixed to each other back to back. Furthermore, the permanent magnet 10 of the rotor 1 is magnetized so that the magnetic flux distribution forms sine waves. Additionally, a structure and an assembling method of the claw pole type stepping motor are disclosed in more detail in the specification and drawings of Japanese Patent Application No. H6-252980 (Japanese Patent Laid-Open No. H8-98498).

Here, in this embodiment, as FIGS. 2 and 3 shown, the axial length M of the permanent magnet 10 of the rotor 1 and the inter-dedendum length L between the dedenda of two teeth 3a, 3a of the A-phase stator 5a and the B-phase stator 5b are set to satisfy the relation of M<L in order that the skew quantity SK of the stator pole teeth 4a of the inner yoke 4 is made larger than that of the stator pole teeth 3a of the outer yoke 3 and thereby each phase of the tertiary high harmonic waves induced in the stator pole teeth 3a, 4a, by magnetic flux interlinked with the coil 2a and the coil 2b, deviates from each other by 180 degrees in electric angle.

Figure 11:
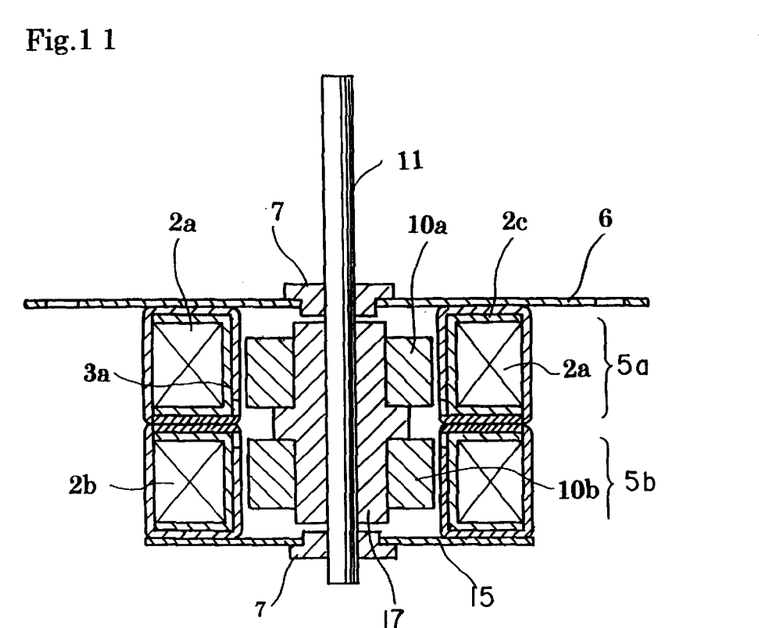
FIG. 11 is a vertical cross section of a stepping motor where the rotor magnet is divided into two pieces.

In this embodiment, as shown in FIG. 4, the skew quantity of the pole teeth 4a of the inner yoke 4 was increased relatively. That is, the area of the pole teeth facing the permanent magnet 10 was increased while maintaining the relationship that the skew quantity SK of the inner stator pole teeth 4a is greater than the skew quantity SK of the outer stator pole teeth 3a. However, as shown in FIG. 11, it is clear that if the permanent magnet of the rotor 1 is divided into two permanent magnets 10a and 10b corresponding to the A-phase stator 5a and the B-phase stator 5b, respectively, even when the skew quantity of the stator pole teeth 3a of the outer yoke 3 is increased relatively, the same function and effect can be obtained.

Figure 6:
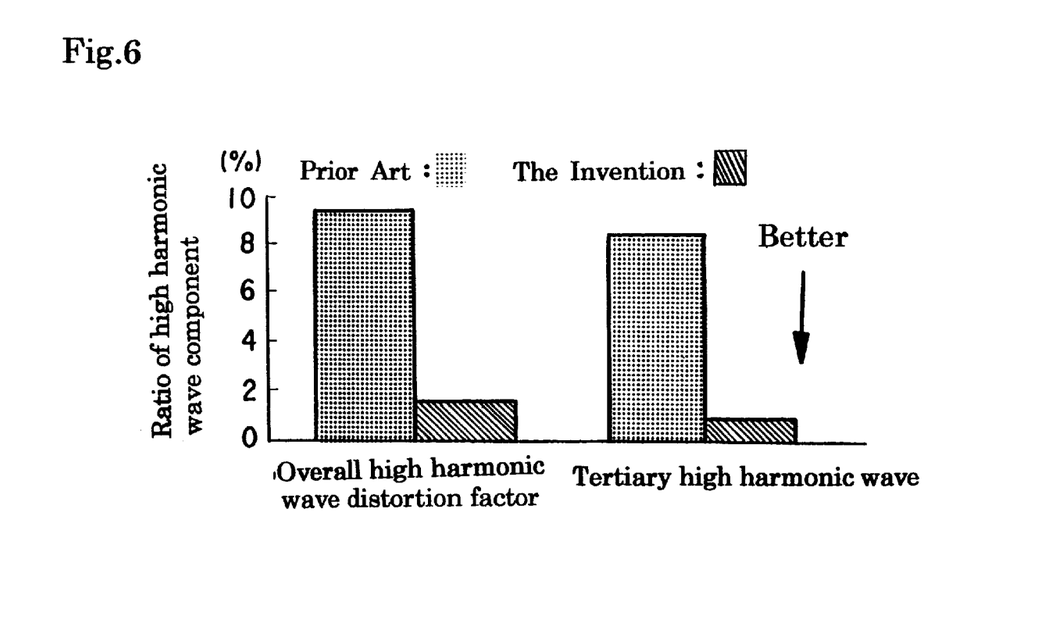
FIG. 6 is a view for comparing the invention with a prior art with regard to each of a distortion factor of the overall high hermetic wave and the tertiary high harmonic wave.
Figure 7:
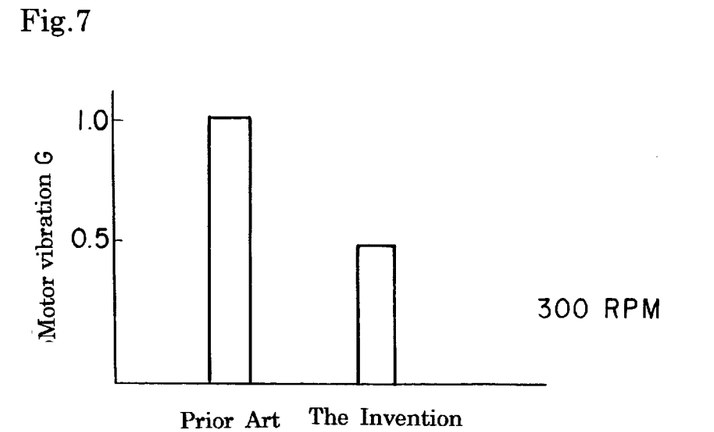
FIG. 7 is a view for comparing the magnitude of motor vibration of the invention with that of a prior art.
Figure 8:
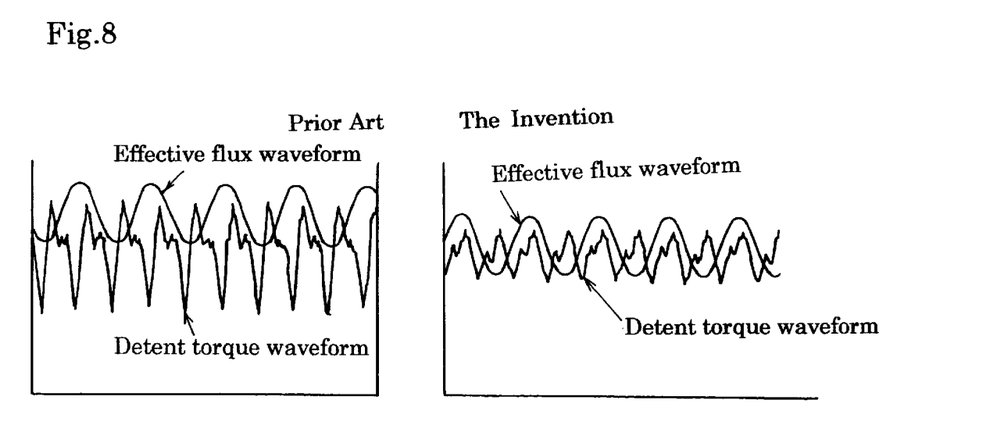
FIG. 8 is a view for comparing the detent torque of the invention with that of a prior art.
Figure 9:
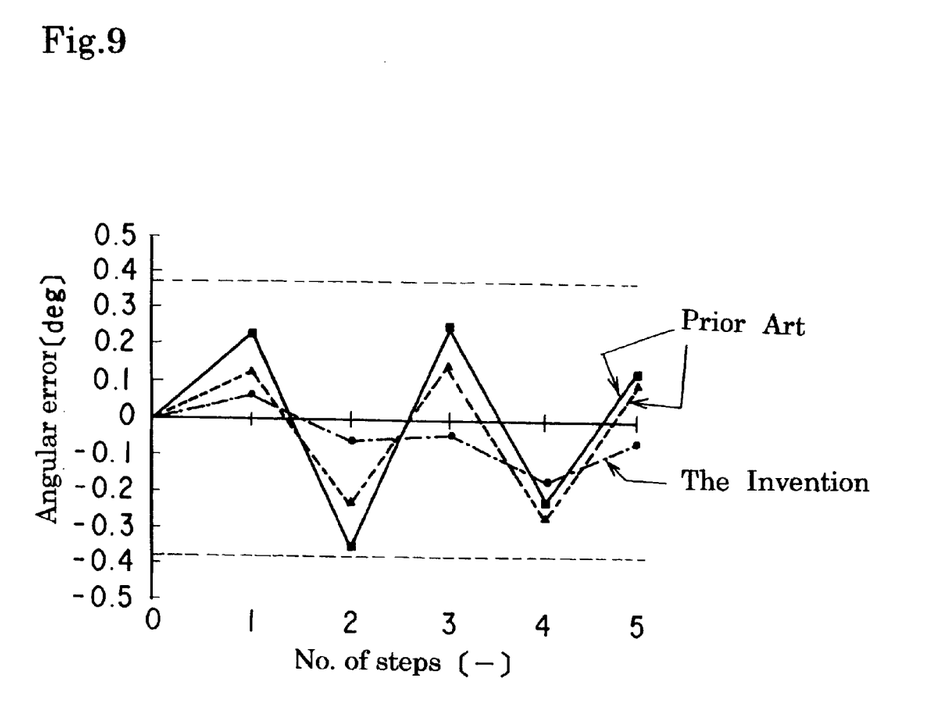
FIG. 9 is a view for comparing the angle error of the invention with that of a prior art.

Next, when the stepping motor of the present invention having the preceding configuration is operated, a distortion factor of the overall high hermetic wave of the induced electromotive force wave, as shown in FIG. 6, can be reduced from 10% to 1.6% in comparison with the conventional motor, and the tertiary high harmonic wave can be reduced from 9% to 0.9%. As a result, the vibration level of the motor can be reduced to ½ of the conventional motor as shown in FIG. 7. Further, as long as the skew quantity is set large, the magnetic flux distribution between the permanent magnet of the rotor 1 and the stator pole teeth of the outer yoke 3 and the inner yoke 4 is smoothed when the rotor 1 is rotated, and further the detent torque caused by the steep permeance variation is reduced by about 60% in comparison with the conventional motor, as shown in FIG. 8. Therefore, the influence of disturbance on the motor torque is decreased, and as shown in FIG. 9, the angle error was reduced from the conventional value of ±4% to the value of less than ±2%, and hence the angle accuracy has been improved.

Figure 10:
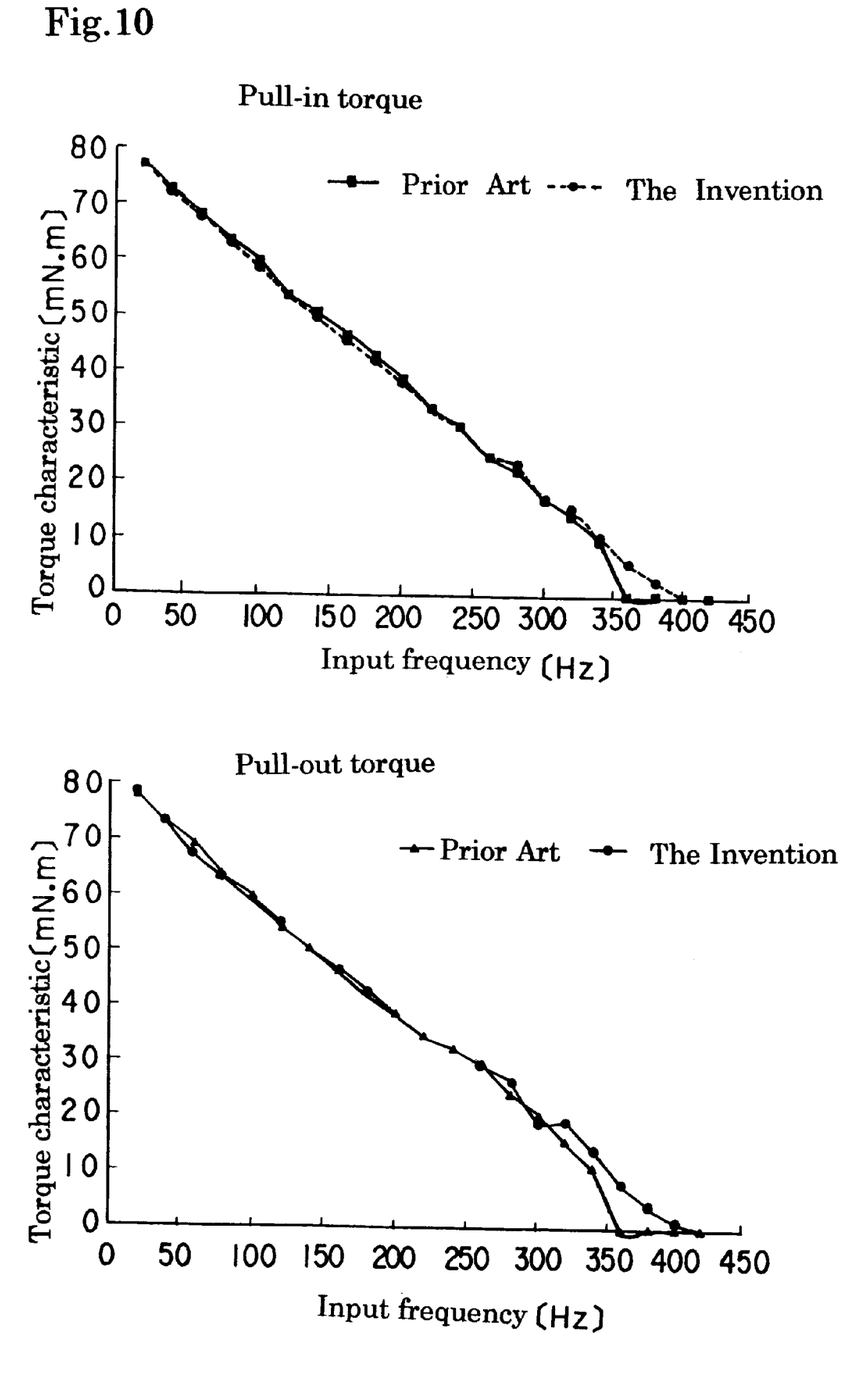
FIG. 10 is a view for comparing the motor torque characteristics of the invention with that of a prior art.

Furthermore, because there is made very small the ratio of the overall high harmonic wave, mainly comprising the tertiary high harmonic wave, to the effective magnetic flux, the detent torque functioning as a brake on the torque generated in the fundamental wave becomes negligible, and besides since the distance between the adjacent stator pole teeth is secured as much as that of the conventional motor, the leakage flux is not influenced to remain unchanged. Accordingly it is seen that the motor torque is equivalent to or somewhat greater than that of the conventional motor as shown in FIG. 10.

Figure 12:
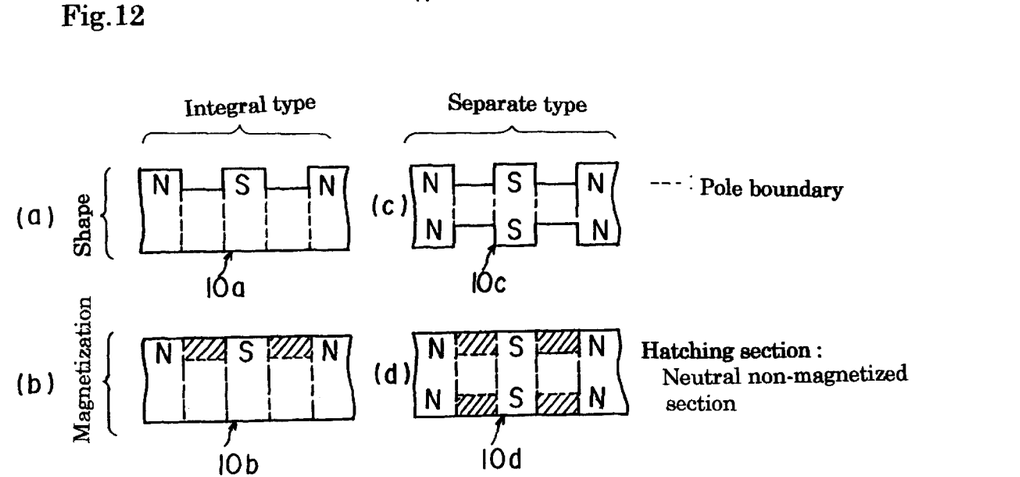

As described so far, according to the present invention, it can be possible to eliminate the rotational unevenness of the rotor 1 and the vibration of the motor which are caused by the tertiary high harmonic wave and improve the angular accuracy, etc while the motor torque remains unchanged. Further, in another embodiment, as shown in FIG. 12(a), there is provided a method of shaping the permanent magnet of the rotor 1 into comb-like teeth as denoted by 10a, or as shown in FIG. 12(b) shows, there is a method of magnetizing the permanent magnet into comb-like teeth as denoted by 10b. Furthermore, in FIG. 12, the cases of 12(a) and 12(b) show examples of separate type magnets in which the permanent magnets 10a and 10b are made corresponding to the A-phase stator 5a and the B-phase stator 5b, respectively, while the cases of 12(c) and 12(d) show examples of integral type magnets in which each of the permanent magnets 10c and 10d is made corresponding to both the A-phase stator 5a and the B-phase stator 5b.

Figure 13:
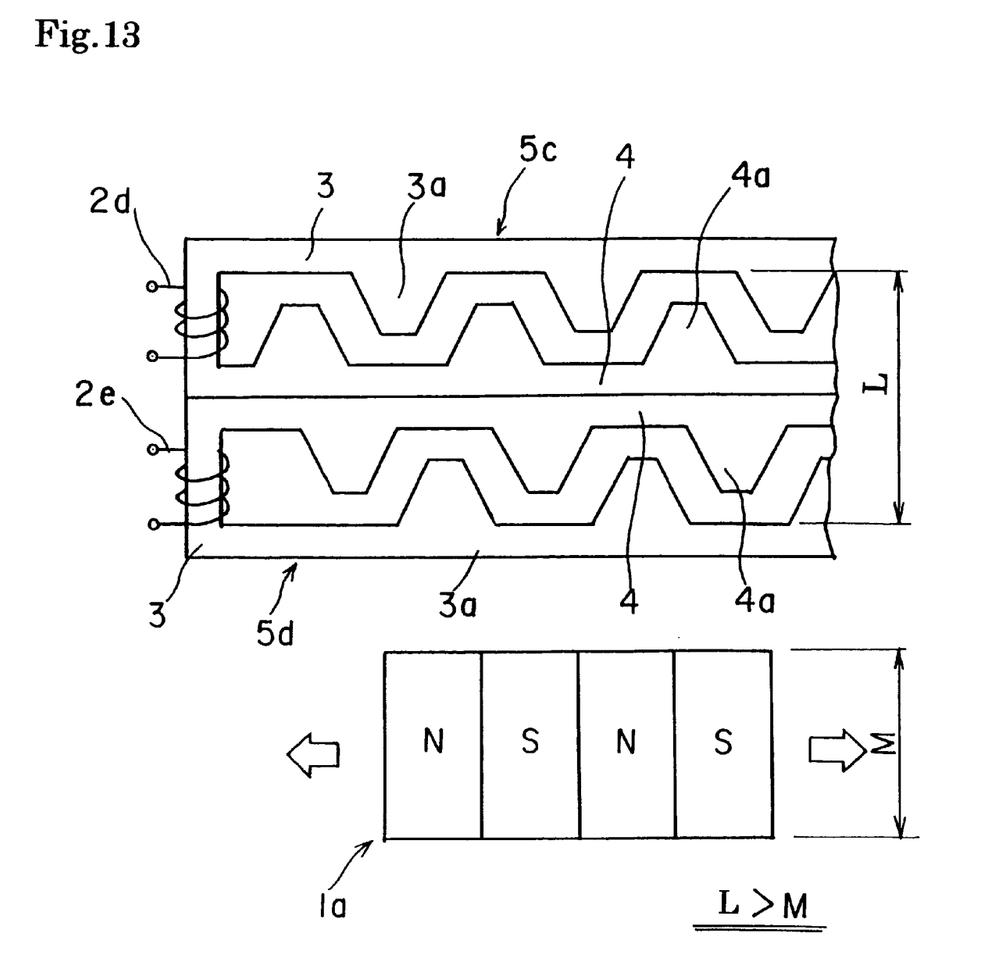
FIG. 13 is a development showing a constitution of the pole teeth and the permanent magnet in a liner motor.

Although the preceding embodiments are explained using the rotative claw pole type pulse motor, it is clear from FIG. 13 that the same effect can be obtained even when the invention is applied to a linear motor type. That is, the A-phase stator 5c and the B-phase stator 5d are developed linearly and disposed in parallel to each other shifting them by 90 degrees from each other in electrical angle, and the rotor 1a having south poles and north poles alternately in their traveling direction is disposed movably over those stators holding a narrow gap therebetween, subsequently pulse signals are applied to the A-phase coil 2d and the B-phase coil 2e, and thereby the rotor 1a travels over the stator pole teeth 3a and 4a. In this case, the width M of the permanent magnet 10 of the rotor 1 and the inter-dedendum length L between the dedenda of two teeth 3a, 3a of the A-phase stator 5a and the B-phase stator 5b are set to satisfy the relation of M<L in order that the skew quantity SK of the stator pole teeth 4a of the inner yoke 4 is made larger than that of the stator pole teeth 3a of the inner yoke 3 and thereby each phase of the tertiary high harmonic waves induced in the stator pole teeth 3a and the stator pole teeth 4a, by magnetic flux interlinked with the A-phase coil 2a and the B-phase coil 2b, deviates from each other by 180 degrees in electric angle. Additionally, the structure of a linear type stepping motor is described in more detail in the Japanese Patent Application No. H7-24392 (Japanese Patent Laid-Open No. H8-223901).

Although the present invention has been described by way of the above embodiments, it is to be appreciated that a variety of modifications and applications are possible within the scope and spirit of the present invention and are not intended to be excluded from the scope of the present invention.

As described above, a motor structure of the invention comprises the followings: a rotor having a permanent magnet externally where north poles (N) and south poles (S) are alternately disposed in a moving direction of the rotor ; a stator comprising a couple of stator yokes each having stator pole teeth to form at least one phase; the stator pole teeth of one stator yoke and that of the other stator yoke being subjected to bearing the different poles each other; the stator pole teeth of each stator yoke facing to the permanent magnet at a predetermined air space and being disposed side by side in the moving direction ; the stator having a coil through which electric current flows to thereby cause the different poles; the stator pole teeth of one stator yoke and that of the other stator yoke being different from each other with respect to an effective area of the teeth through which magnetic flux passes ; whereby phases of higher harmonics waves from the stator pole teeth of one stator yoke and that of the other stator are shifted from each other by 180 degree in electric angle to thereby cancel mutually the higher harmonics waves.

Then, the invention can reduce the motor vibration in rotational movement which is a problem in prior art without deteriorating the motor characteristics, besides without increasing a rotor inertia, additionally can obtain a motor with high angle accuracy without increasing a manufacturing cost to thereby enlarge an applicable scope of a stepping motor or the like.

What is claimed is:

1. A multi-phase motor structure having a rotor and at least one stator, comprising:

the rotor having an external permanent magnet where north poles (N) and south poles (S) are alternately disposed in a moving direction of the rotor;

a first one of the at least one stator including a pair of stator yokes each having stator pole teeth to form at least one phase;

the stator pole teeth of each of said stator yokes facing the permanent magnet with a predetermined air gap therebetween and being disposed side-by-side in the moving direction;

the stator having a coil through which electric current flows to thereby cause the stator pole teeth of each of said stator yokes to bear different poles of each other; and the stator pole teeth of each of said stator yokes being different from each other with respect to an effective area of the teeth through which a magnetic flux passes and each phase of higher harmonic waves from the stator pole teeth being shifted from each other by 180 degrees in an electrical angle mutually canceling the higher harmonic waves by performing one of changing a skew of the pole teeth, adjusting a length of the external permanent magnet of said rotor and adjusting an axial length of the first one of the at least one stator.

2. A motor structure according to claim 1, wherein the motor structure is applied to a linear motor by disposing the first stator and a second stator parallel to each other and shifting them by 90 degrees in an electrical angle.

3. A motor structure according to claim 1, wherein the motor structure is applied to a stepping motor equipped with the rotor having cylindrical permanent magnet.

4. A motor structure according to claim 1, wherein the at least one stator comprises two stators which are put one on another to shift a pole teeth position of each of said two stators by 90 degree in an electrical angle.

5. A motor structure according to claim 4, wherein each of the effective areas of the pole teeth positioned at outer sides in the axial direction is smaller than that of the pole teeth positioned at inner sides.

6. A multi-phase motor structure having a primary means and a secondary means, comprising:

the secondary means having an external permanent magnet where north poles (N) and south poles (S) are alternately disposed in a moving direction of the secondary means;

the primary means comprising a pair of primary yokes each having primary pole teeth to form at least one phase;

the primary pole teeth of each of said primary yokes facing the permanent magnet with a predetermined air space therebetween and being disposed side by side in the moving direction;

the primary means having a coil through which electric current flows to thereby cause the different poles to bear the different poles of each other; and the primary pole teeth of each of said primary yokes being different from each other with respect to the an effective area of the teeth through which a magnetic flux passes and each phase of higher harmonic waves from the primary pole teeth being shifted from each other by 180 degrees in an electrical angle mutually canceling the higher harmonic waves by performing one of changing a skew of the pole teeth, adjusting a length of the external permanent magnet and adjusting an axial length of the primary means.

* * * * *

UNITED STATES PATENT AND TRADEMARK OFFICE
CERTIFICATE OF CORRECTION

PATENT NO. : 6,031,304
DATED : February 29, 2000
INVENTOR(S) : Yuzuru Suzuki, et al It is certified that error appears in the above-identified patent and that said Letters Patent is hereby corrected as shown below:

On the title page: Item [75] Inventors: delete "-ken".

Col. 1, line 58, change "downing" to --downsizing--.

Col. 2, line 53, insert --,-- after "far".

Col. 4, line 14, insert --,-- after "interval".

Col. 7, line 29, insert --a-- after "having".

Col. 7, line 33, change "degree" to --degrees--.

Signed and Sealed this

Twentieth Day of February, 2001

Attest:

NICHOLAS P. GODICI

Attesting Officer

Acting Director of the United States Patent and Trademark Office